United States Patent [19]
Kajander

[11] Patent Number: 6,163,385
[45] Date of Patent: Dec. 19, 2000

[54] INTEGRATED AND AUXILIARY LIGHT FOR IMAGE SCANNERS FOR SCANNING TRANSPARENCIES AND METHOD OF LIGHTING TRANSPARENCIES FOR IMAGE SCANNING

[76] Inventor: Richard Emil Kajander, 331 N. Dulton Dr., Toledo, Ohio 43615

[21] Appl. No.: 09/092,888

[22] Filed: Jun. 8, 1998

[51] Int. Cl.[7] .................................................. H04N 1/04
[52] U.S. Cl. .......................................... 358/475; 358/487
[58] Field of Search .................................. 358/487, 475, 358/506, 509, 497, 496, 484; 355/75, 67, 69; 399/380; 362/307, 310; 357/179

[56] References Cited

U.S. PATENT DOCUMENTS 5,781,311   7/1998  Inoue et al. ............................. 358/475
5,883,728   3/1999  Kow ......................................... 358/494
5,898,508   4/1999  Bekanich ................................. 358/474

*Primary Examiner*—Cheukfan Lee
*Attorney, Agent, or Firm*—John H. Miller

[57] ABSTRACT

A universal transparency adapter for use on flat bed image scanners. The transparency adapter, which is placed on the image window of an image scanner, utilizes circumferential back lighting to uniformly project through and illuminate the desired transparent image to be scanned. A circular or other perimeter surrounding light source provides lighting to the transparency original in an economical and simple manner. The inventive light source can also be integrated with a conventional scanner by using the inventive light source as a lid for the conventional scanner.

21 Claims, 2 Drawing Sheets

INTEGRATED AND AUXILIARY LIGHT FOR IMAGE SCANNERS FOR SCANNING TRANSPARENCIES AND METHOD OF LIGHTING TRANSPARENCIES FOR IMAGE SCANNING

BACKGROUND

The present invention relates to a light or transparency adapter for image scanners and in particular to a light for scanning transparencies for general use with any flat bed type or hand held type of image scanner and the resulting combination of this transparency adapter and a scanner of any type. The present invention also relates to a method of lighting transparencies for scanning.

Flat bed image scanners are widely used to electronically read full page or smaller images and text, formed on paper-like and film-like media. Flat bed scanners have motor driven, traversing, linear optical sensing heads to provide a uniform scan. These have largely displaced narrow, hand held scanners which are smaller by design, require steady hand movement and are usually equipped with non-standardized electronic interfaces.

The typical flat bed scanner is a box style device with a clear glass top image window designed to accept the original media to be scanned and subsequently electronically copied. These units tend to have industry standardized electronic interfaces to allow easy connection to such items as personal computers. Inside and beneath the clear glass top of the flat bed scanner is a transversing linear array optical sensing head, usually close-coupled to its own light source so as to illuminate, by reflection. This is the way the scanner reads opaque media, such as printed paper or photographs, placed image-side down on the glass top window of the scanner.

Transparent media such as photographic negatives, or slides, transparencies, x-rays, etc. require transmitted illumination for scanning and cannot use reflective light sources only to obtain desirable results. The typical close-coupled light sources within flatbed scanners are inadequate. Conventional additional attachments designed to provide overhead transmitted light in conjunction with or in synchronization with the transversing optical sensing head are available, but are complicated and expensive for the occasional or home user. These attachments tend to be customized for the specific flatbed scanner in use. A major concern is providing uniform, transmitted lighting through the transparent media during the scanning and to do so simply and inexpensively.

One such adapter for use on a flat bed scanner to scan transparencies is disclosed in U.S. Pat. No. 5,467,172. This patent discloses a rectangular box with a light module having two linear tubular florescent bulbs and with two light diffuser plates and a lighting guide located between the bulbs and the transparency to be scanned. The light source is on both sides of the transparency adapter, and many parts are required to try to get uniform light to the object to be scanned. This reference neither discloses nor suggests the present invention.

Another means for back lighting a scanner to enable it to scan x-rays, etc. is disclosed in U.S. Pat. No. 5,430,289. The device disclosed in this patent is a scanner lid having a light source built in containing at least one fluorescent linear tube bulb. This reference acknowledges the variations in light intensity such a light source produces and the reduced quality of the transparency scan that this variation causes. This reference discloses apparatus for compensating or correcting this variation by adding several pieces of expensive equipment including a sensor to measure the light intensity and to convert the actual light intensity into an electrical signal and a second controller to control the lamp intensity. This solution and device is impractical or very expensive for the occasional and/or home users.

Hand held scanners suffer from the same problems, but with the geometry reversed. Inside the hand held scanner is a fixed linear optical array sensing head with a close-coupled reflective light source. The opaque media is usually placed image side up, on a flat surface and the hand held scanner is manually moved across the medians surface. A light source for allowing scanning of transparencies on a hand held scanner is disclosed in U.S. Pat. No. 5,282,081. The device disclosed there includes a single fluorescent linear tube lamp, reflective mirror, a lens and numerous other elements which must work in concert to achieve a uniform light intensity, all of which make the device very expensive and complex for the occasional and/or home user.

A still different device for use in scanning transparencies and for compensating for different intensities of light striking different parts of the transparency is disclosed in U.S. Pat. No. 4,568,984. This complex solution simultaneously performs opaque and transparent master scanning to generate scanning signals for each point on the transparency and to eliminate amplitude errors in the transparency scan by combining the recognition signal with the actual image signal. This again is a complex and relatively expensive solution for the occasional and/or home user.

Another converter for allowing a normal reflective scanner to also scan transparencies like x-ray film is disclosed in U.S. Pat. No. 5,381,245. This conversion requires a linear lamp and a lamp support to be attached to the scanners traversing assembly in some undisclosed manner and the use of various transparent and white opaque calibration strips and means for converting light passing through one of the calibration strips into a digital signal. This conversion device would be too expensive and too difficult to attach to the typical scanner to be practical for scanning transparencies by the occasional and/or home user.

Another converter for allowing a typical reflective scanner to also scan transparencies is disclosed in U.S. Pat. No. 5,483,356. This converter comprises a housing with one or more linear light bulbs mounted therein and a light transmitter plate with a protective layer on an exposed side. This reference acknowledges that the uniformity of the light passing through the transparency can be made more uniform and brighter by using two or more linear light bulbs in the housing instead of only one. Aside from requiring two or more bulbs for good uniformity, the light transmitter must be a special material such as some undisclosed kind of polycarbonate material of some undisclosed thickness. Even if this converter works well, it suffers from a nonuniform light source and it is more expensive and more complicated than desired.

Attempting to get a more uniform light source, a transparency adapter disclosed in U.S. Pat. No. 5,652,665 uses an oval shaped refractor and a refractor plate with a hot cathode-ray tube light source. Aside from these relatively expensive items, a traversing mechanism is required to move this light source across the transparency for scanning. Consequently, this adapter would be very expensive for the occasional user and/or home transparency scanner.

Flat bed image scanners, once confined to the industrial and professional fields, have recently gained in general popularity because of lowered prices, effectively displacing the previously cheaper hand held scanners, but today's scanners are still hampered by not having an inexpensive, simple light assembly for scanning transparencies. There are specialty scanners which will only scan negatives and slides, to address this need, but especially for home and occasional use on transparencies, it is desirable to have a universal adapter, that is simple in design and cost effective, that can be used in with any typical flat bed scanner to scan transparent media.

Light fixtures for using round, ring shaped flourescent bulbs are known, but these are made to be permanently affixed to a ceiling or the like and they are not only different from the present invention, but would not be suitable for use in place of the present invention. It is also known to use a round flourescent bulb to surround and light a magnifying glass for bench work and other type of work such as microsurgery as disclosed in U.S. Pat. No. 5,312,393, but these devices are substantially different than the present invention and would be unsuitable to use as a transparency adaptor.

SUMMARY OF THE INVENTION

The present invention is based on the concept that if the light source surrounds the object to be scanned, the uniformity of light on the object, and hence the quality of the scanned material, will be much enhanced. The principal object of this invention is to provide an improved light for use with any flat bed or hand held scanner and which provides uniform, peripheral, circular, circumferential lighting via a perimeter or ring shaped light source, such as a round fluorescent bulb, in a very cost effective manner. The light can be integrated with a scanner to make a dedicated transparency scanner, or can be in the form of an auxiliary light that can be used with conventional scanners for scanning transparencies. Such a light can also be fitted with a power feed or brightness control interface to a specific scanner or scanners, or a simple power cord that can plug into any wall or extension outlet. Wherever used in this application, "transparency", shall include all types of items to be scanned where a portion of the item is transparent to light.

The present invention utilizes a circular or other perimeter style light source, preferably comprised of a hot or cold cathode fluorescent lamp or lamps. The effective diameter of the lighting assembly is large enough to accommodate typical transparent media such as 35 mm slides and various sizes of photographic negatives up to roughly 6 inches square or larger. The lamp or lamps can be frosted or clear and can be reflectively coated on the outer perimeter of the lamp diameter to further reflect light to the inner light path. The overall effective diameter of the circular light is preferably in the range of 7 to 15 inches, but can be smaller or larger, to allow for placement on top of most flat bed image scanners. The housing for the light can be reflective on the inside surface and is fitted with a removable translucent or frosted sheet, such as a sheet of frosted or milk glass or white plastic, located between the circular light and the transparency to be scanned.

To operate the circular light assembly, or transparency adapter, of the present invention, the face of the translucent sheet on the transparency adapter is placed upon a transparency sitting on the glass image window of a flatbed scanner with the transparency located inside the inner periphery of the ring shaped light. The transparency adapter does not need cover the entire glass image window of the scanner, nor is there a concern with illuminating or even covering all of the image window, glass surface, of the underlying image scanner. Once the transparency adapter of the present invention is in the proper position and turned on, the scanner can be operated in its normal manner to scan the transparency.

The transparency adapter can be used upside-down with hand held scanners and can be equipped to run from typical alternating current or be fitted with batteries and a DC-to-AC inverter to be completely portable. An optional viewing port can be incorporated into the housing of the transparency adapter to aid in positioning and centering the transparent media with a flat bed scanner and the transparency adapter.

BRIEF DESCRIPTION OF THE DRAWINGS

The present invention will be better understood from the following description of some preferred embodiments thereof which are shown in the attached drawings.

DETAILED DESCRIPTION OF THE INVENTION

Figure 1:
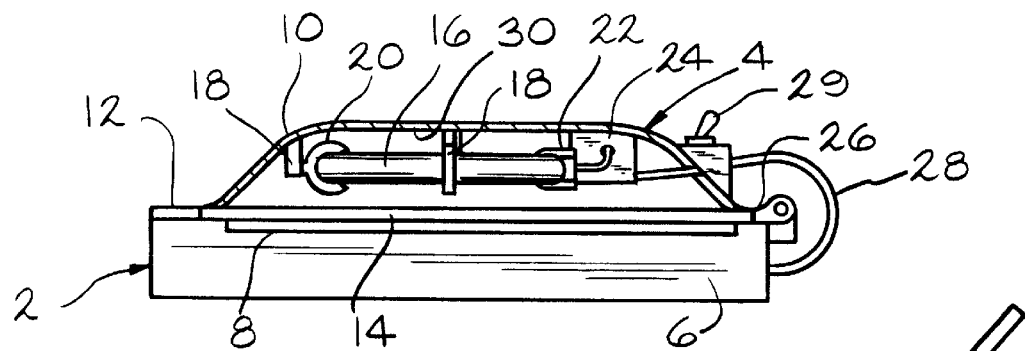
FIG. 1 is a front view of the circular light for transparency scanning of the present invention integrated with a flat bed scanner that is permanently rigged for scanning both opaque items and transparencies.

FIG. 1 shows a conventional flat bed scanner 2 having an illuminating transparency circular light or transparency adapter 4 of the present invention integrated therewith. The conventional flat bed scanner 2 comprises a conventional base portion 6 with a glass image window 8 in its upper surface. Hinged to the base 6 of the scanner 2 with a conventional hinge 26 is the circular light assembly 4 of the present invention. The circular light assembly 4 comprises an opaque housing 10, and optionally an opaque skirt 12 that extends beyond the housing 10 to cover the surface of the glass image window 8 that extends beyond the housing 10. This skirt 12 is not an essential feature, but merely a preferred feature as the present invention will work fine without the skirt 12. The outer flange dimensions would be approximately 9" by 15" so as to fully cover the underlying flat bed scanner glass image window on a "legal size" document scanner, yet still be useful on smaller sizes.

Mounted inside the housing 10 is a circular, ring or perimeter shaped, annular, light source 16 such as a round fluorescent bulb or other ring shaped, peripheral, circumferential light. The light source of the present invention produces a ring or near ring of light with no light being generated directly in the interior of the ring. The ring shaped light source 16 is mounted to the housing by any suitable manner such as with supports 18 attached to the inside of the housing 10 and attached to brackets 20 which attach to, or support, the ring shaped light source 16. The ring shaped light source 16 is preferably spaced a small distance from the inside of the housing 10, such as one quarter to one half inch, but other spacings are suitable, including mounting the light against an inside surface 30 of the housing 10. When the ring shaped light source 10 is a round fluorescent bulb, a ballast 24 is required and this can be mounted inside the housing 10 as shown in FIG. 1. The fluorescent bulb is attached to the ballast 24 via conventional connector 22. The ballast is powered by a power cord 28 which can be connected to a power source inside the scanner body 6 or which can be plugged into any power outlet. Preferred lamb bulbs are the standard circular fluorescent bulb, such as General Electric's model FC12T9-CW which is a 12" diameter, 32 watt device, the 8.25" diameter version at 22 watts, or the 6.5" version at 20 watts, or any assembly of standard circular, other custom semi-circular, annular, ring shaped, rectangular, square, other perimeter light sources are suitable. Any closed or nearly closed shape, such as any polygon shaped light source is suitable.

U shaped light sources are also suitable, particularly when two are used to form a ring shaped light source. Using only one U shaped light source is suitable, especially when the two vertical sections of the light source are substantially longer than the dimension of the item to be scanned, such as the length of the scanner image window.

The inside surface of the housing 10 is, or can be coated with, or made of, a reflecting material like a thin layer of brushed or polished metal, or alternately coated with a flat, specular or polished white, off-white, silver or metallic-like coating of chrome or nickel plated metal like steel, or in the preferred mode where the housing is made of a plastic, the inside is plated or coated with a shinny material. A translucent sheet or plate 14 is mounted to the open side of he housing 10 and below the ring shaped light source 16 as shown in FIG. 1. This can be a thin plate of translucent milk glass, frosted glass, or milky colored plastic, like acrylic, as is used in automobile tail light and head light covers. This diffuses the light coming from the ring shaped light source 16 to further enhance consistency of light intensity across the transparency surface.

Figure 2:
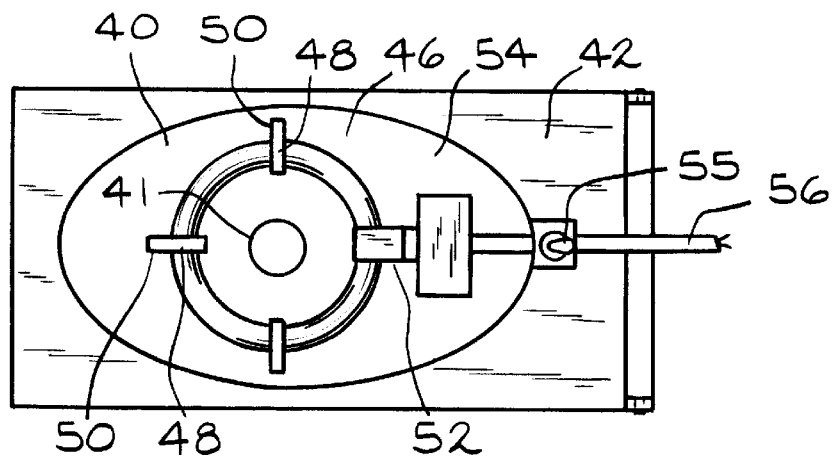
FIG. 2 is a top view of the transparency illuminating adapter shown in FIGS. 1 and 1A.
Figure 3:
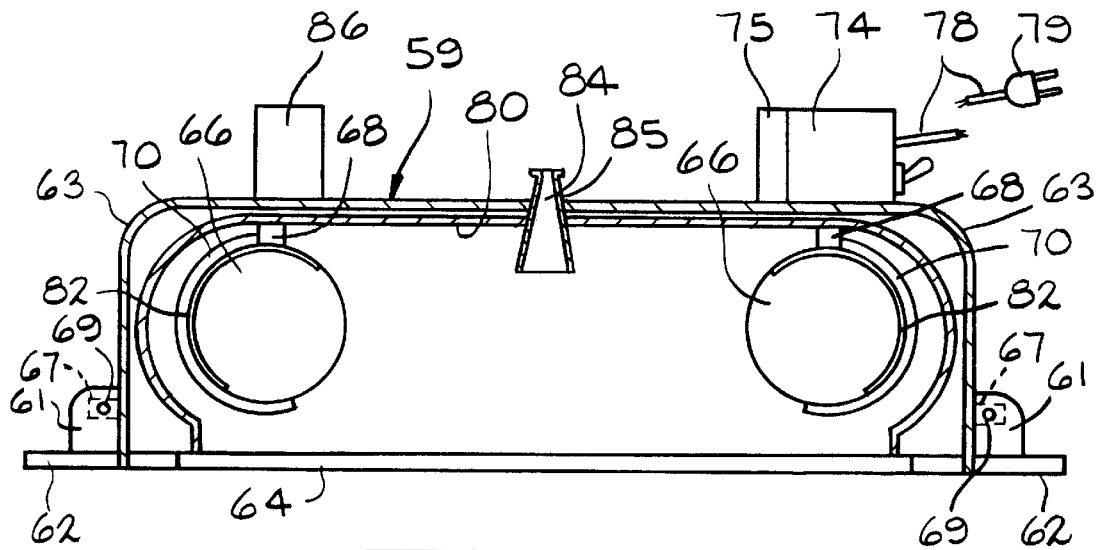
FIG. 3 is a cross section of another illuminating transparency adapter embodiment of the present invention.

Finally, the light assembly of the present invention can optionally have a viewing tube 41 as shown in FIGS. 2 and 3 (feature 84). This viewing tube 41 allows the operator to center the transparency inside a vertical projection of the ring shaped light source 16, which is desired.

The scanner of FIG. 1 having a ring shaped light source assembly of the present invention mounted in a housing acts as a lid for a conventional scanner. When scanning opaque items, the light source 16 is not turned on. To scan transparencies, the transparency to be scanned is centered on the center of the window 8 of the scanner 2 in a position to be within the vertical projection of the ring shaped light source 16 and the lid containing the light assembly 4 of the present invention is closed. The ring shaped light source 16 is turned on with a switch or brightness control 29 and the scanner is energized to scan in a normal manner. A superior scan results due to the improved uniformity of light intensity striking all parts of the transparency.

Figure 1A:
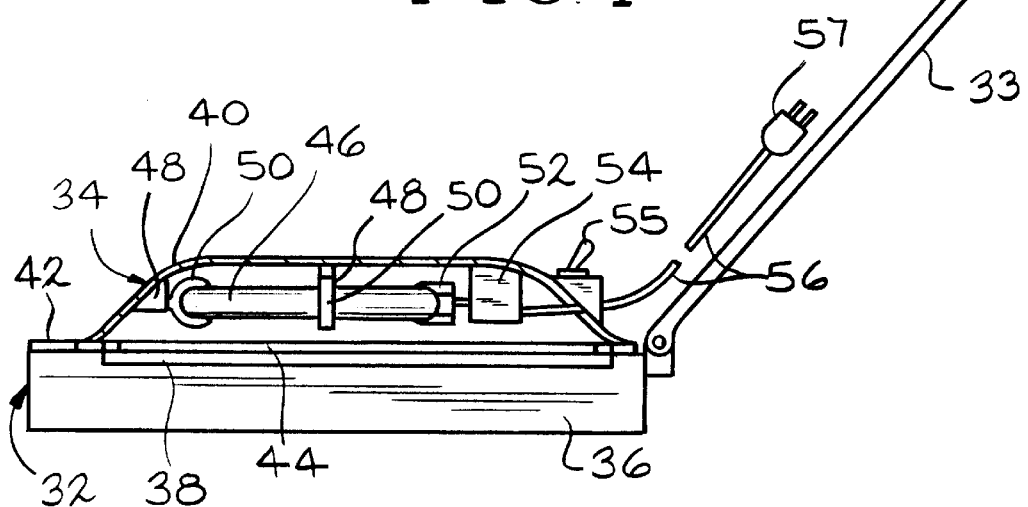
FIG. 1A is front view of a transparency illuminating adapter of the present invention that can be used with any type of flat bed scanner or hand held scanner.

The embodiment shown in FIG. 1A is almost identical to the embodiment just described above, but in this embodiment the ring shaped transparency assembly or transparency adapter 34 is a stand alone unit that can be used on any conventional flat bed scanner 32. The conventional scanner 32 has a base assembly 36, an image window 38 and a hinged lid 33. This transparency adapter embodiment 34 of the present invention comprises a housing 40, preferably opaque, an optional opaque skirt 42 and a translucent plate 44 which can be attached to the housing 40 with a snap fit or attached with mechanical retainers such as pins or screws.

Inside the housing 40 is mounted a ring shaped, annular light source or assembly 46, comprised of a tungsten-halogen or other metal halide or halogen vapor lamp, fluorescent bulb, quartz lamp, incandescent tubular or other, etc. The annular lamp bulb 46 is mounted with mounts 48 and conventional bulb brackets 50. The lamp 46, when fluorescent, connects to a ballast 54 with a connector 52 that is conventional for annular, ring shaped fluorescent bulbs. The ballast 54 is attached to the interior of the housing 40. A power cord 56, with an optional conventional two or three pronged plug 57, or connected to a power source in the scanner base 36, runs through an on/off switch or brightness control 55 to the ballast 54 so the light 46 can be conveniently turned on when ready to scan a transparency. FIG. 2, a top view of the transparency adapter shown in FIGS. 1 and 1A, but numbered like FIG. 1A, shows an optional view tube 41 which can be seen in more detail in FIG. 3.

When using the transparency adapter 34 on a conventional scanner 32 to scan transparencies, the lid 33 of the scanner is opened wide or lifted off to be out of the way as shown in FIG. 1A. The transparency to be scanned is placed on the image window 38, centered top to bottom and side to side on the image window 38. The transparency adapter 34 of the present invention is placed on the flat bed scanner 32 in such a way as to center the transparency inside a vertical projection of the inner circumference of the ring shaped light source 46. The sight hole 41 or sight tube can be used to aid centering the transparency adapter 34 onto the transparency. The switch or brightness control 55 is used to turn the light 46 on to scan a transparency.

The transparency adapter 34 can also be used with a hand scanner. Here the adapter 34 is turned to rest on a table on the back side of the housing 40, a transparency centered on the translucent plate 44, the lamp 46 turned on and a hand scanner then used to scan the transparency.

In the embodiments shown, the length of the translucent diffuser plates 14 and 44 are almost as long as the image window 8 or 38 of the scanner, but this is not necessary. Normally, the diffuser plate of the transparency adapter of the present invention will be shorter than the image window of the scanner it is used with.

Figure 4:
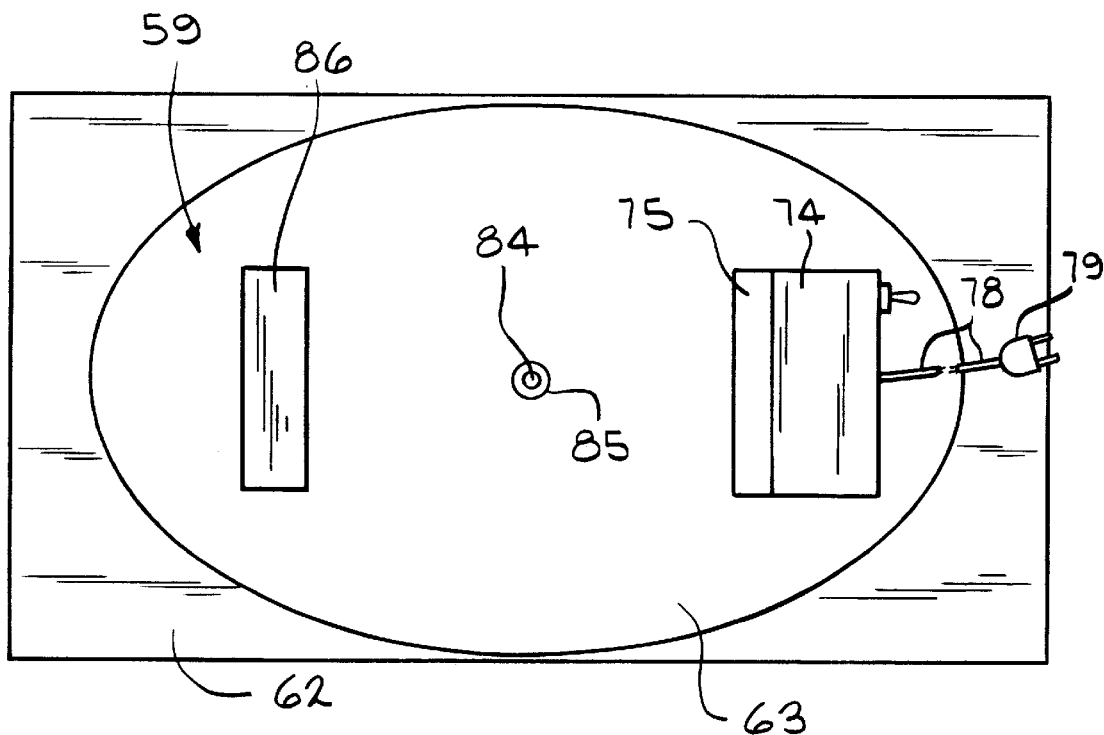
FIG. 4 is a top view of the embodiment shown in FIG. 3.

The most preferred embodiment shown in FIGS. 3 and 4 is a transparency adapter 59 that is similar to the embodiments described above, but has some significant differences. On this embodiment a housing 63 is round instead of oval like the embodiments of FIGS. 1 and 1A. An optional, and removable, skirt 62 is attached to the housing 63 by any known means, such as with brackets 61 attached the skirt 62, and removable pins 68 passing through a hole in each bracket and a hole in each lug 67 attached to the housing 63. A translucent plate 64, as described earlier, is attached to the lower part of the housing 63 and encloses the open side of the housing 63.

Mounted or suspended in the housing 63 is an annular, ring shaped lamp or light source 66. Again, a round fluorescent bulb is preferred for lamp 66. The lamp is supported with supports 68 attached to lamp brackets 70 which preferably contact the outer periphery of the lamp bulb. The lamp bulb 66 is powered with a ballast 74 mounted on top of the housing 63. A power cord 78 with an optional switch or brightness control (not shown) and a two or three prong plug 79 feeds power to the ballast 74. For use in remote areas where an electricity outlet is not available, an optional battery pack 75 can be attached to the top of the housing 63 and connected to the lamp 66 or ballast 74 through a well known DC to AC inverter circuit.

The inside surface of the housing 63 can be coated or faced with a reflective coating or layer 80 to reflect light down onto the transparency. However, it is preferred to coat the outer and top portions of the lamp bulb 66 with a known reflective coating 82 to cause all the light from the bulb 66 to be directed towards the transparency to be scanned. An optional leg 86 is molded in or attached to the top of the housing 63 to allow the transparency scanner 59 to be stored or used upside down on a table, desk, etc. while setting on the leg 86 and ballast 74. This leg could hold a second or spare battery pack like battery pack 75 to use when battery pack 75 is depleted of charge.

Finally, the transparency adapter 59 preferably has a sight hole, viewing port or lens 84 aligning with the center of the area inside the lamp bulb 66 to assist in placing a transparent original media prior to scanning. This sight hole 84 can be surrounded with a sight tube 85 that shields the user from light from the lamp bulb 66 as shown. Other shapes for the sight tube 85 are suitable so long as the sight tube 85 does not interfere with the light coming from the lamp bulb 66 and traveling to the transparency to be scanned.

Perimeter lighting of transparent media eliminates shadows and internal light source "ghosts" because the image area of importance is not directly back lighted when scanned. No complicated light paths or light guides, no traveling light source with mechanical or electrical interfaces to the scanner's transversing head, no electronic compensation for the transmitting light source and no complicated mirror or semi-reflective assemblies are required in the design.

The removable opaque skirt 62 is of such a size as to easily overlap the underlying glass image window of the flat bed scanner which is typically no larger than approximately 8-½" by 14" and often 8" by 10-½". The dimensions and shape of the outer housing 63 and the light source 66 is shown in its best practice as circular but it is readily apparent to those well versed in the art that the shape can be any polygram, oval or combination of these. Preferably, the outside effective diameter of the outer housing 63 should not much exceed 15" and not much less than 4". Optical density filters, while not shown, are readily available as thin flexible films, hard plastic or glass plates, and can be optionally used in conjunction with the invention as disclosed by placing the filter between a translucent cover plate 64 and the optical slide or negative transparency original. Laying a pair of polarizing films, one on top of the other, on top of the transparency to be scanned and then rotating the top film in a known manner in the light path can also provide a lighter or darker backlight. Most flat bed scanners have associated, or are used in conjunction with, software support to electronically lighten or darken a scanned image, therefore the opaque skirt 62 and optical density filters are not needed in many instances.

It is also well known that light sources run at very high alternating frequencies, much greater than 60 cycles per second, can be electrically adjusted for brightness. Typical rapid start flourescent lights running at 60 cycles per second are more difficult to run in a dim mode.

The preferred embodiments of the invention are not concerned with providing back lighting to the complete image window area of the underlying flat bed image scanner. A universal and economical transparency adapter is of such a size as to conveniently straddle a typical transparency such as a 35 mm slide or two to six 35 mm negatives grouped on a film strip within its inner circumferential light path. It is known by those well versed in the art that negatives typically provide a better image source for scanning than scanning a positive paper copy and that the general market need for transparency scanning is mostly concerned with scanning relatively small sized home photography related transparencies such as 35 mm slides, 8 mm motion picture clips and so-called snapshot camera negatives. The general market is not involved with large format negatives or transparencies.

It is apparent that although the invention has been described in connection with preferred embodiments, those skilled in the art may make changes to the preferred embodiments without departing from concept taught herein and the scope of the invention as defined in the following claims.

I claim:

1. A transparency adapter for use with a flat bed or hand held image scanner to scan transparencies, negatives, slides, and X-rays comprising an opaque housing with a closed or nearly closed annular or polygonal perimeter light source mounted therein, said housing covering a top of said light source and extending down, but spaced from an outer periphery of said light source to a point beyond the bottom of said light source.

2. The transparency adapter of claim 1 wherein said light source is a ring shaped fluorescent bulb.

3. The transparency adapter of claim 2 wherein said housing also contains a ballast for said fluorescent bulb.

4. The transparency adapter of claim 2 further comprising a hinge portion that will attach to a conventional scanner mount, said hinge portion attached to a scanner mount on a scanner, the transparency adapter forming a lid for the conventional scanner.

5. The transparency adapter of claim 4 further comprising a power cord feeding a ballast for said fluorescent bulb, said power cord having a switch to enable power to be turned on and off to said ballast.

6. The transparency adapter as claimed in claim 5 having the perimeter light further diffused through a translucent plastic or glass cover plate mounted below said light source.

7. The transparency adapter as claimed in claim 2 having the perimeter light further diffused through a translucent plastic or glass cover plate mounted below said light source.

8. The transparency adapter of claim 7 further comprising a power cord feeding a ballast for said fluorescent bulb, said power cord having a switch to enable power to be turned on and off to said ballast.

9. The transparency adapter of claim 2 wherein a ballast for said fluorescent bulb is mounted on the exterior of said housing.

10. The transparency adapter of claim 1 further comprising a hinge portion that will attach to a conventional scanner mount, said hinge portion attached to a scanner mount on a scanner, the transparency adapter forming a lid for the conventional scanner.

11. The transparency adapter as claimed in claim 1 wherein a power cord draws power control or brightness control from the underlying image scanner in use through an electrical cable or other interface.

12. The transparency adapter as claimed in claim 1 having the perimeter light further diffused through a translucent plastic or glass cover plate mounted below said light source.

13. The transparency adapter of claim 12 further comprising a power cord feeding a ballast for said fluorescent bulb, said power cord having a switch to enable power to be turned on and off to said ballast.

14. The transparency adapter as claimed in claim 1 having a viewing port or lens with or without a viewing tube located in the housing centrally of said annular or polygonal light source to assist in placing a transparent original media prior to scanning.

15. The transparency adapter as claimed in claim 1 having a removable or integral opaque skirt to cover the unused portion of an image window of an underlying flat bed scanner.

16. The transparency adapter of claim 1 wherein the horizontal cross section of said housing is a circle.

17. The transparency adapter of claim 1 wherein the horizontal cross section of said housing is an oval or near oval.

18. A transparency adapter in combination with a conventional flat bed or hand held image scanner to scan transparencies, negatives, slides, and X-rays comprising an opaque housing with a closed or nearly closed annular light source mounted therein, said housing covering a top of said light source and extending down, but spaced from an outer periphery of said light source to a point beyond the bottom of said light source, said transparency adapter being attached to said image scanner.

19. A method of scanning an item selected from the group consisting of transparencies, negatives, slides, and X-rays on a conventional reflective scanner comprising opening a lid on said scanner, placing and centering the item to be scanned on an image window of said scanner, placing a transparency adapter over said item, said transparency adapter comprising a housing with a closed or nearly closed annular or polygonal perimeter light source mounted therein, said housing covering the top of said light source and extending around and down, but spaced from an extreme outer periphery of said light sources to a point lower than a lowest extremity of said light source, said transparency adapter placed such that said item is within a vertical projection of the inner peripheral circumference of said light source.

20. The method of claim 19 wherein the light source is a ring shaped fluorescent bulb.

21. The method of claim 19 wherein a pair of polarizing films, one on top of the other, is placed on top of the item before scanning and the top polarizing film is then rotated before scanning to achieve a lighter or darker backlight.

* * * * *